US012132274B2

(12) United States Patent
Pao et al.

(10) Patent No.: US 12,132,274 B2
(45) Date of Patent: Oct. 29, 2024

(54) CONNECTOR FOR FITTING WITH A DOCKING CONNECTOR COMPRISING AN ELECTRICAL MODULE PLUG AND ADDITIONAL MODULE PLUGS

(71) Applicant: STARCONN ELECTRONIC (Su Zhou) Co., LTD., Kunshan (CN)

(72) Inventors: Chung Nan Pao, New Taipei (CN); Fu Su, Kunshan (CN); Hong Yang Ping, Kunshan (CN); Dong Qi Kuang, Kunshan (CN)

(73) Assignee: STARCONN ELECTRONIC (Su Zhou) Co., LTD., Kunshan (CN)

( * ) Notice: Subject to any disclaimer, the term of this patent is extended or adjusted under 35 U.S.C. 154(b) by 347 days.

(21) Appl. No.: 17/681,867

(22) Filed: Feb. 28, 2022

(65) Prior Publication Data

US 2022/0294151 A1 Sep. 15, 2022

(30) Foreign Application Priority Data

Mar. 12, 2021 (CN) ........................ 202120527969.X

(51) Int. Cl.

*H01R 13/514* (2006.01)
*H01R 43/24* (2006.01)
*H01R 12/51* (2011.01)
*H01R 12/52* (2011.01)
*H01R 12/70* (2011.01)
*H01R 12/71* (2011.01)
(Continued)

(52) U.S. Cl.
CPC ........... *H01R 13/514* (2013.01); *H01R 43/24* (2013.01); *H01R 12/51* (2013.01); *H01R 12/52* (2013.01); *H01R 12/7005* (2013.01); *H01R 12/7064* (2013.01); *H01R 12/71* (2013.01); *H01R 12/712* (2013.01); *H01R 12/716* (2013.01); *H01R 13/50* (2013.01); *H01R 43/20* (2013.01)

(58) Field of Classification Search
CPC ...... H01R 13/514; H01R 43/24; H01R 12/51; H01R 12/52; H01R 12/7005; H01R 12/7064; H01R 12/71; H01R 12/712; H01R 12/716; H01R 13/50; H01R 43/20
See application file for complete search history.

(56) References Cited

U.S. PATENT DOCUMENTS

2009/0275240 A1* 11/2009 Gong .................. H01R 12/712 439/638
2022/0052469 A1* 2/2022 Huang ................ H01R 13/518

* cited by examiner

*Primary Examiner* — Justin M Kratt
(74) *Attorney, Agent, or Firm* — Samson G. Yu

(57) ABSTRACT

The disclosure relates to a connector for fitting with a docking connector comprising an electrical module plug and additional module plugs, the connector comprising a housing, the housing comprising a first receiving portion concavely provided with a socket from the front wall toward the rear wall of the housing and a second receiving portion provided on the front wall. The connector further comprises a terminal comprising a terminal head portion and a terminal connecting portion which are connected to each other, the terminal head portion being bent at an angle with respect to the terminal connecting portion, such that the terminal head portion is provided in the second receiving portion for connecting to the additional module plugs and the terminal connecting portion is provided on an outer surface of one of the two side walls. The connector can be compatible with additional applications while being suitable for standard applications.

16 Claims, 8 Drawing Sheets

(51) Int. Cl.
*H01R 13/50* (2006.01)
*H01R 43/20* (2006.01)

CONNECTOR FOR FITTING WITH A DOCKING CONNECTOR COMPRISING AN ELECTRICAL MODULE PLUG AND ADDITIONAL MODULE PLUGS

TECHNICAL FIELD

The disclosure generally relates to a field of connector, and particularly to a connector for fitting with a docking connector comprising an electrical module plug and additional module plugs.

BACKGROUND

Current standard connectors only have a receiving portion for receiving an electrical module plug of a docking connector. Thus, the standard connector is only suitable for standard applications, and cannot be compatible with other applications, such as applications in high voltage power supply.

SUMMARY

In order to overcome the described defect existing in the prior art, this disclosure provides a connector for fitting with a docking connector comprising an electrical module plug and additional module plugs, wherein the connector comprises a housing having a front wall, a rear wall and two opposite side walls connecting the front wall and the rear wall, wherein the housing comprises a first receiving portion concavely provided with a socket from the front wall toward the rear wall of the housing for receiving the electrical module plug of the docking connector and a second receiving portion provided on the front wall for receiving the additional module plugs of the docking connector, wherein the connector further comprises a terminal comprising a terminal head portion and a terminal connecting portion which are connected to each other, the terminal head portion being bent at an angle with respect to the terminal connecting portion such that the terminal head portion is provided in the second receiving portion for connecting to the additional module plugs, and the terminal connecting portion being provided on an outer surface of one of the two side walls.

Further, the second receiving portion comprises a front portion and a rear portion opposite to each other and a top portion and a bottom portion opposite to each other and connecting the front portion and the rear portion, and the second receiving portion comprises two side portions opened by penetrating the two side walls of the housing; wherein the second receiving portion further comprises an internal accommodation space defined by the front portion, the rear portion, the top portion, and the bottom portion, the terminal head portion being inserted into the internal accommodation space from one of the two side portions of the second receiving portion in a direction perpendicular to the one side wall or in a direction parallel to the front wall.

Further, the second receiving portion comprises an internal accommodation space and at least one insertion hole concavely provided from the front wall and in communication with the internal accommodation space, the terminal head portion being provided within the internal accommodation space, and at least a part of the terminal head portion being exposed from the at least one insertion hole for connecting to the additional module plugs when the at least one insertion hole receives the docking connector.

Further, the second receiving portion comprises an internal accommodation space, the terminal head portion being provided within the internal accommodation space, and barbed protrusions being respectively provided at an upper side and a lower side of the terminal head portion which are opposite to each other, and the barbed protrusions being in interference fit with the second receiving portion.

Further, in the internal accommodation space of the second receiving portion, a gap is left between the terminal head portion and the front portion or the rear portion of the second receiving portion, wherein the terminal head portion comprises an elastic portion, such that when the terminal head portion is fitted with the additional module plugs, the elastic portion can elastically deform within the gap towards the front portion or the rear portion of the second receiving portion.

Further, a distance between the front portion and the rear portion of the second receiving portion is greater than 0.2 mm.

Further, the connector further comprises at least one insulation member connected to an outer surface of the corresponding side wall of the housing, wherein the terminal connecting portion of the terminal is connected to the insulation member and provided between the insulation member and the housing.

Further, the insulation member is molded together with the terminal to form a wafer.

Further, the second receiving portion comprises an internal accommodation space concavely provided from the two side walls and in communication with each other, the angle where the terminal head portion is bent relative to the terminal connecting portion being 90 degrees or approximately close to the corresponding angle intersected by the front wall and the one side wall of the housing, such that the terminal connecting portion is attached on the outer surface of the one side wall of the housing, and the terminal head portion is inserted into the internal accommodation space of the second receiving portion in a direction perpendicular to the one side wall or in a direction parallel to the front wall.

Further, the terminal is an optical module terminal, a high-voltage electrical module terminal or a grounding module terminal.

Further, the connector comprises two terminals, the terminal connecting portions of which being respectively provided on the outer surfaces of the two opposite side walls, and the terminal head portions of the two terminals being symmetrically provided in the second receiving portion for connecting to the additional module plugs.

Further, the second receiving portion comprises an internal accommodation space and at least one insertion hole concavely provided from the front wall and in communication with the internal accommodation space, the terminal head portion being provided within the internal accommodation space and the terminal head portion extending in a direction perpendicular to the one side wall or in a direction parallel to the front wall to overlap with the at least one insertion hole for connecting to the additional module plugs when the at least one insertion hole receives the docking connector.

Further, the connector comprises at least one insulation member connected to an outer surface of the one side wall of the housing, the terminal connecting portion of the terminal comprising a terminal tail portion and a terminal middle portion located between the terminal head portion and the terminal tail portion, wherein the insulation member is molded together with the terminal middle portion of the terminal to form a wafer, and the terminal head portion of the terminal is exposed outside the wafer.

Further, the second receiving portion further comprises an internal accommodation space concavely provided from the two side walls and in communication with two side portions opened by penetrating the two side walls of the housing, the terminal head portion being inserted into the internal accommodation space of the second receiving portion in a direction perpendicular to the one side wall or in a direction parallel to the front wall, the internal accommodation space being separated from the socket of the first receiving portion by a distance or the internal accommodation space being separated from the socket of the first receiving portion by at least one wall, the internal accommodation space and the socket of the first receiving portion being two independent spaces Further, the connector comprises two second receiving portions and two terminals, wherein the terminal head portions of the two terminals are respectively provided in the two second receiving portions and the terminal connecting portions of the two terminals are provided on an outer surface of one of the two side walls, or the terminal connecting portion of one of the two terminals is provided on an outer surface of one of the two side walls and the terminal connecting portion of the other of the two terminals is provided on an outer surface of the other of the two side walls.

In addition, the disclosure further provides a connector for fitting with a docking connector comprising an electrical module plug and additional module plugs, wherein the connector comprises a housing having a front wall, a rear wall and two opposite side walls connecting the front wall and the rear wall, wherein the housing comprises: two first receiving portions, each of which being concavely provided with a socket from the front wall toward the rear wall of the housing, for receiving the electrical module plug of the docking connector; and two second receiving portions provided on the front wall, for receiving the additional module plugs of the docking connector, wherein the connector further comprises two terminals, each of which comprising a terminal head portion and a terminal connecting portion which are connected to each other, the terminal head portion being bent at an angle with respect to the terminal connecting portions such that the terminal head portion is provided in the corresponding second receiving portion for connecting to the additional module plugs, wherein the terminal connecting portions of the two terminals are provided on an outer surface of same one of the two side walls, or the terminal connecting portion of one of the two terminals is provided on an outer surface of one of the two side walls and the terminal connecting portion of the other of the two terminals is provided on an outer surface of the other of the two side walls.

By means of the above arrangement, the connector of the disclosure can be compatible with additional applications while being suitable for standard applications.

BRIEF DESCRIPTION OF THE DRAWINGS

The drawings for providing further understanding of the disclosure constitute a part of the disclosure, and the illustrative embodiments of the disclosure and illustrations thereof are used to explain the disclosure, rather than constitute inappropriate limitation on the disclosure. In the drawings.

DETAILED DESCRIPTION OF THE EMBODIMENTS

Hereinafter, the technical solutions in the embodiments of the disclosure will be described in detail with reference to the accompanying drawings in the embodiments of the disclosure. It is important to note that the embodiments of the disclosure and the features in the embodiments can be combined without conflicts.

Figure 1:
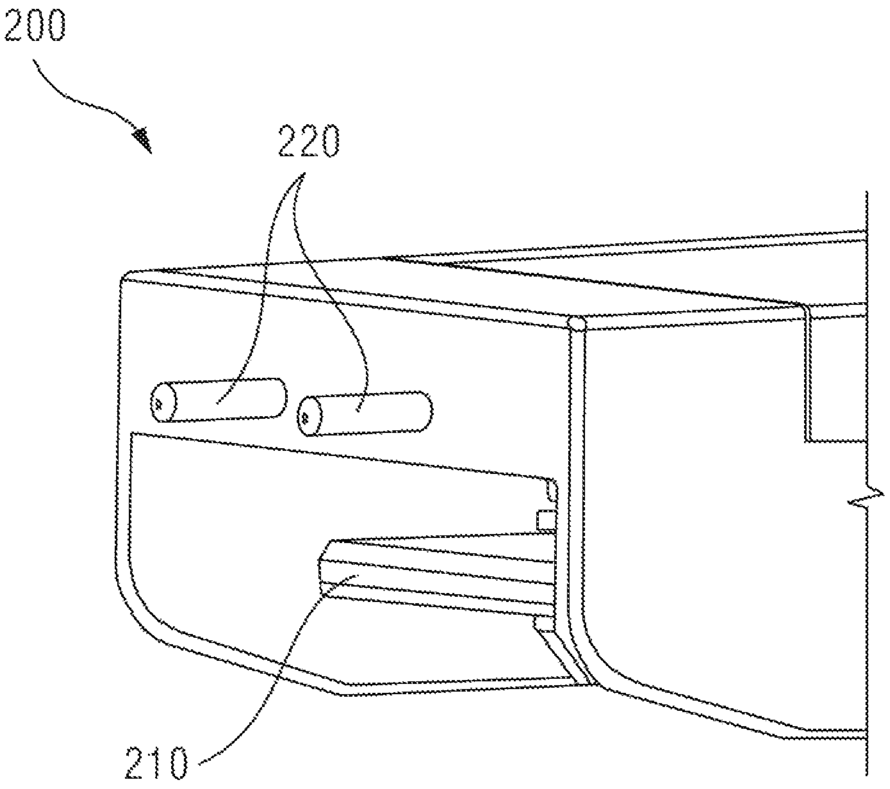
FIG. 1 is a partial perspective view showing a docking connector.
Figure 2:
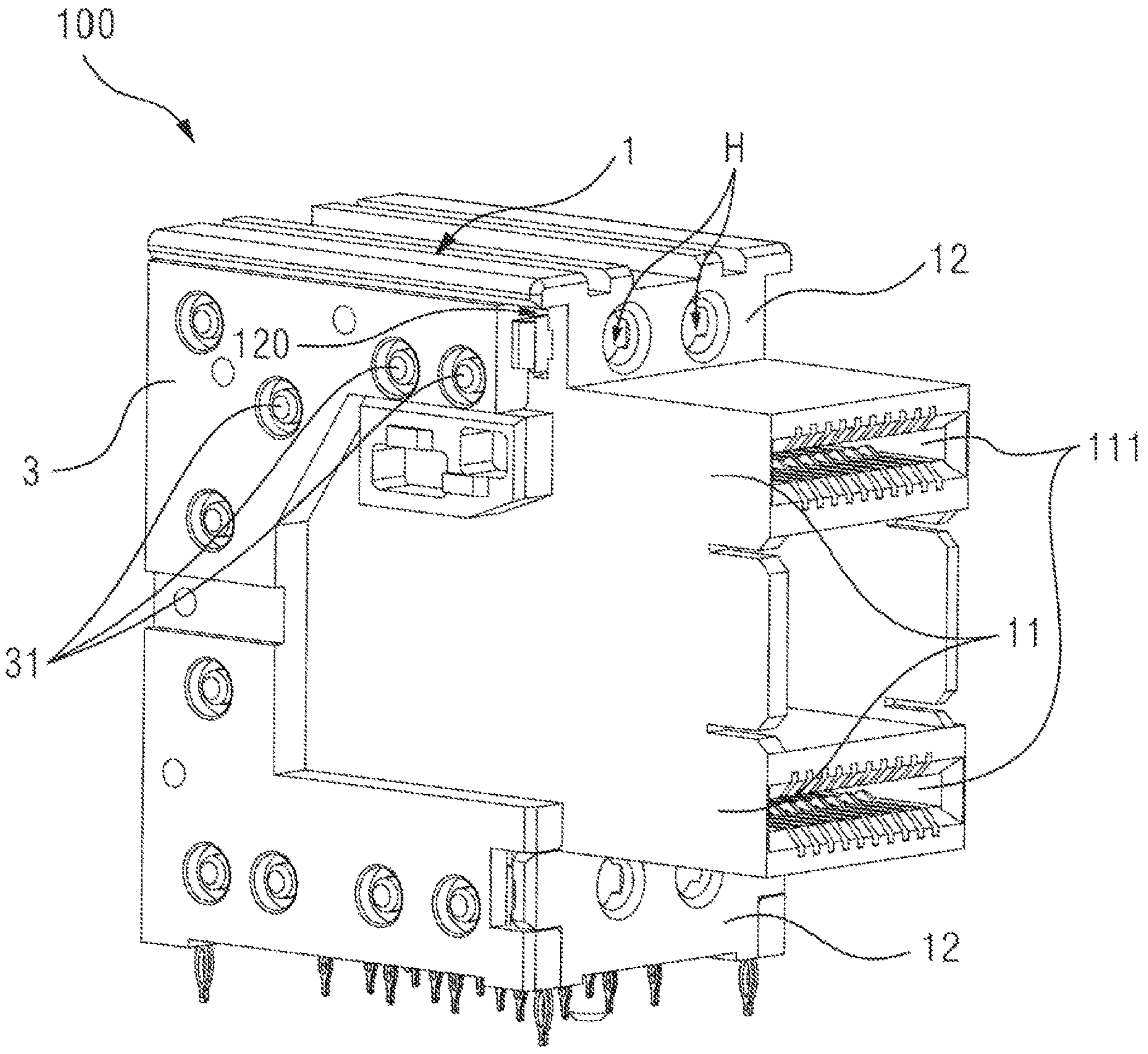
FIG. 2 is a perspective view showing a connector of the disclosure.

In FIG. 1, a docking connector 200 is shown, and the docking connector 200 comprises an electrical module plug 210 and additional module plugs 220. As shown in FIG. 2, the disclosure provides a connector 100 for fitting with the docking connector 200 comprising an electrical module plug 210 and additional module plugs 220, wherein the connector 100 comprises a housing 1 having a front wall (which is defined as the wall of the housing 1 located closed to the right location in FIG. 2), a rear wall (which is defined as the wall of the housing 1 located closed to the left location in FIG. 2) and two opposite side walls connecting the front wall and the rear wall (which is defined as the two walls of the housing 1 located not closed to the up and down locations in FIG. 2 and not closed to the left and right locations in FIG. 2).

Figure 3:
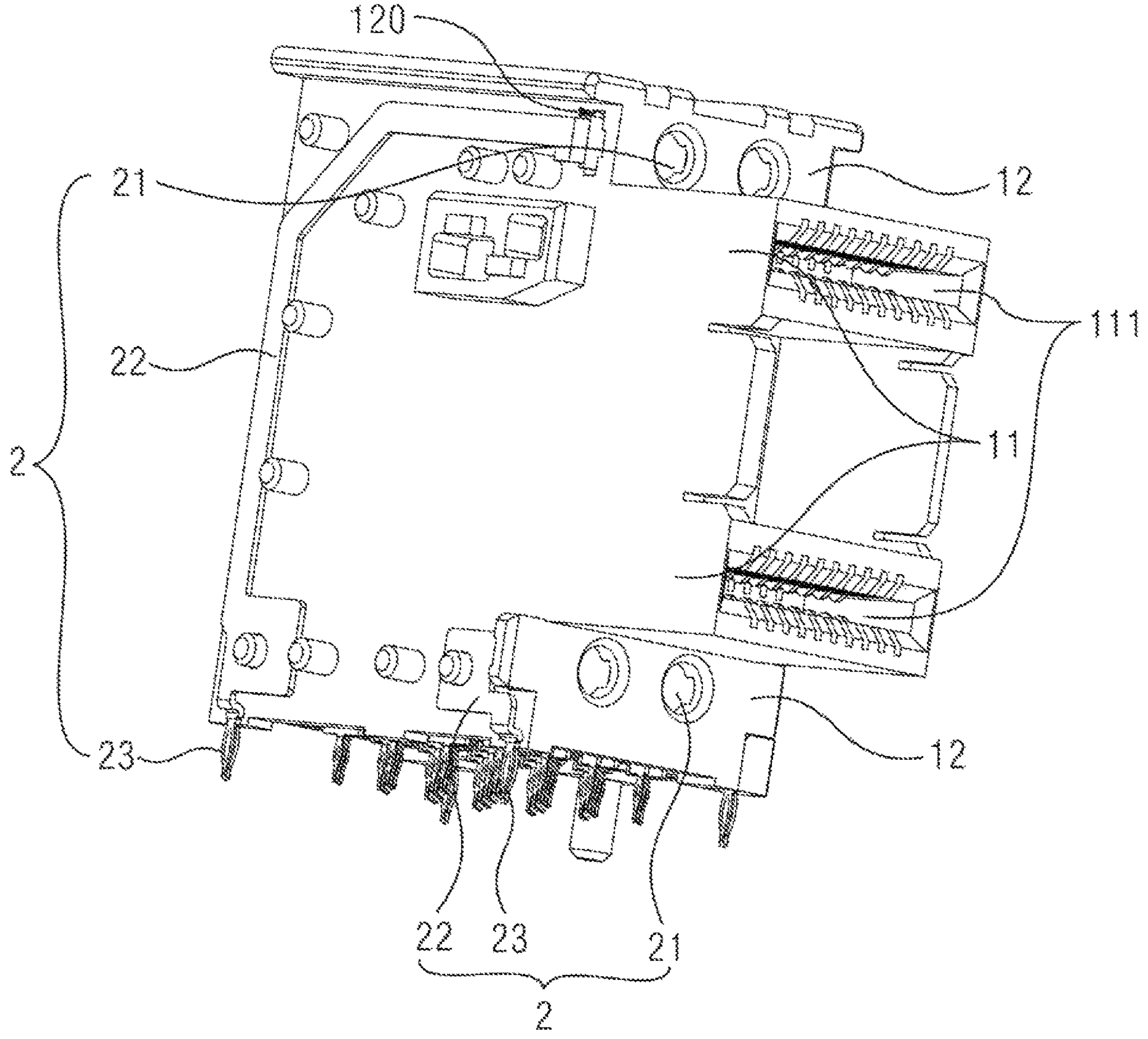
FIG. 3 is a perspective view showing a connector of the disclosure, wherein a insulation member is removed for clarity.

As shown in FIGS. 2 and 3, the housing 1 may comprise first receiving portions 11 and second receiving portions 12. The first receiving portions 11 are concavely provided with sockets 111 from the front wall toward the rear wall of the housing 1, for receiving the electrical module plug 210 of the docking connector 200. The housing 1 further comprises a space inside, which is in communication with the socket 111, and this space is used for assembling or accommodating a connector body comprising a plurality of terminals and/or other electronic elements. The second receiving portions 12 are provided on the front wall, for receiving the additional module plugs 220 of the docking connector 200. In FIGS. 2 and 3, the connector 100 of the disclosure is shown in the form of a double-layer connector, which comprises two first receiving portions 11 and two second receiving portions 12. The two first receiving portions 11 may be located between the two second receiving portions 12; or the two second receiving portions 12 may be located between the two first receiving portions 11; or the two first receiving portions 11 may be both located above the two second receiving portions 12 or both located below the two second receiving portions 12; or the two first receiving portions 11 and the two second receiving portions 12 may be arranged in sequence or arranged in a staggered manner. In another non-illustrated embodiment of the disclosure, the connector 100 has the form of a double-layer connector, and may comprise two first receiving portions 11 and one second receiving portion 12, or one first receiving portion 11 and two second receiving portions 12, wherein the first receiving portions 11 and the second receiving portions 12 are arranged in sequence or arranged in a staggered manner, or the first receiving portions 11 are both located above or below the second receiving portions 12. However, in another non-illustrated embodiment of the disclosure, the connector 100 may also have a form of a single-layer connector, i.e., having only one first receiving portion 11 and only one second receiving portion 12. The positional relationship between the first receiving portion 11 and the second receiving portion 12 may be that the second receiving portion 12 is located above or below the first receiving portion 11. In addition, the number of the second receiving portions 12 of the connector 100 and the positions thereof on the front wall of the housing 1 may be correspondingly set according to the number and positions of the additional module plugs 220 of the docking connector 200. However, the disclosure is not limited thereto.

As shown in FIG. 3, the connector 100 also comprises terminals 2. The terminals 2 each comprise a terminal head portion 21 and a terminal connecting portion (i.e., the remaining part of the terminal 2 other than the terminal head portion 21) which are connected to each other. The terminal head portion 21 is bent at an angle α with respect to the terminal connecting portion such that the terminal head portion 21 is provided in the second receiving portion 12 for connecting to the additional module plugs 220, and the terminal connecting portion is provided on an outer surface of one of the two side walls.

Figure 4:
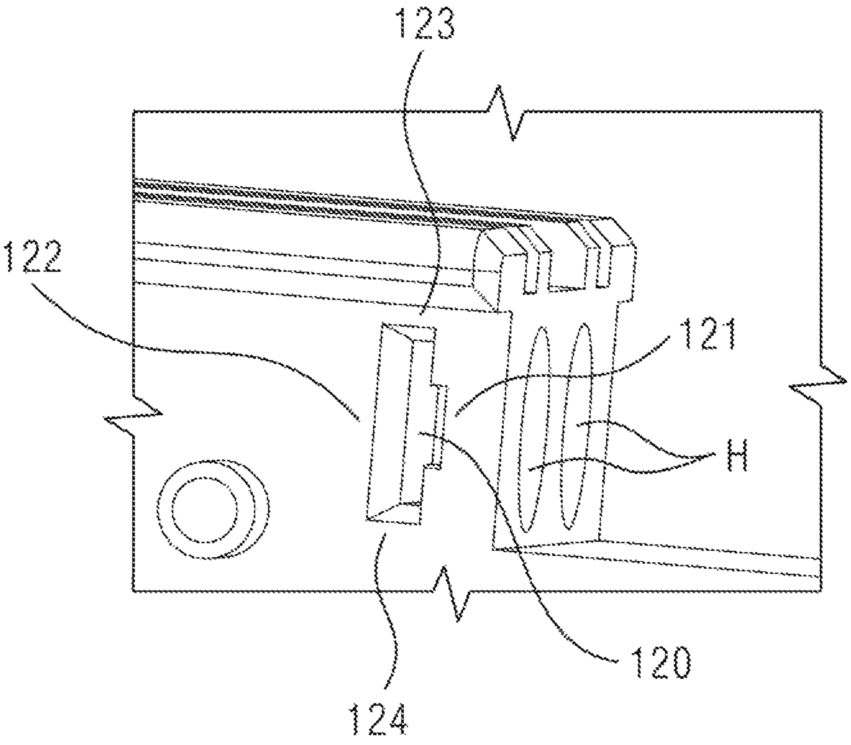
FIG. 4 is a perspective view showing a part of a housing of the connector of the disclosure.

As shown in FIG. 4, the second receiving portion 12 may comprise a front portion 121 and a rear portion 122 opposite to each other and a top portion 123 and a bottom portion 124 opposite to each other and connecting the front portion 121 and the rear portion 122, and each second receiving portion 12 comprises two side portions opened by penetrating two side walls of the housing 1, wherein the front portion 121 may be formed by a part of the front wall.

As shown in FIG. 4, the second receiving portion 12 may further comprise an internal accommodation space 120 defined by the front portion 121, the rear portion 122, the top portion 123 and the bottom portion 124. The internal accommodation space 120 may concavely provided from and is in communication with the two side portions opened by penetrating the two side walls of the housing 1, and the internal accommodation space 120 is separated from the socket 111 of the first receiving portion 11 by a distance, or the internal accommodation space 120 is separated from the socket 111 of the first receiving portion 11 by at least one wall defined as the rear portion 122 and/or the bottom portion 124. Thus, the internal accommodation space 120 is not in communication with the socket 111 of the first receiving portion 11 and the space for assembling or accommodating the connector body, that is to say, the internal accommodation space 120 and the socket 111 are two independent spaces. The rear portion 122 and/or the bottom portion 124 may be a partition or partitions inside the housing 1, but the disclosure is not limited thereto. The terminal head portion 21 may be inserted into the internal accommodation space 120 from one of the two side portions of the second receiving portion 12 in a direction perpendicular to the side wall or in a direction parallel to the front wall. By means of such arrangement, good fixation of the terminal head portion 21 of the terminal 2 can be ensured.

As shown in FIGS. 2-4, the second receiving portion 12 may comprise at least one insertion hole H concavely provided from the front wall (or from the front portion 121) and in communication with the internal accommodation space 120 (two insertion holes H are shown in FIG. 3), so as to guide the additional module plugs 220 of the docking connector 200 and achieve insulation from the housing of the docking connector 200. Further, the insertion holes H may be a hole that penetrates the whole front portion 121 in a direction from the front wall to the rear wall to communicate with the internal accommodation space 120. The terminal head portion 21 is provided within the internal accommodation space 120, and at least a part of the terminal head portion 21 is exposed from the at least one insertion hole H, for connecting to the additional module plugs 220 when the at least one insertion hole H receives the docking connector 200. The number of the insertion holes H may be determined as required or according to the additional module plugs 220 of the docking connector 200, but the disclosure is not limited thereto.

The connector 100 having the form of a single-layer connector or a double-layer connector of the disclosure may comprise only one terminal 2, the terminal connecting portion of which being provided on (an outer surface of) one side wall as seen in FIG. 3. The terminal head portion 21 of the terminal 2 extends in a direction perpendicular to the side wall or in a direction parallel to the front wall and is inserted into the internal accommodation space 120, and the terminal head portion 21 may extend to overlap the two insertion holes H in a direction perpendicular to the side wall or in a direction parallel to the front wall.

In another embodiment, for the connector 100 in the form of a double-layer connector in the disclosure, as shown in FIG. 3, another terminal 2 may be provided in the lower second receiving portion 12 and has a similar possible configuration and arrangement to the terminal 2 of the upper second receiving portion 12. In addition, the two terminals 2 respectively provided on the upper and lower second receiving portions 12 may be provided on same one side wall or respectively on two opposite side walls. In other words, the bending direction of the terminal head portion 21 of one terminal 2 with respect to the terminal connecting portion thereof may be opposite to or the same as the bending direction of the terminal head portion 21 of another terminal 2 with respect to the terminal connecting portion thereof.

Figure 9:
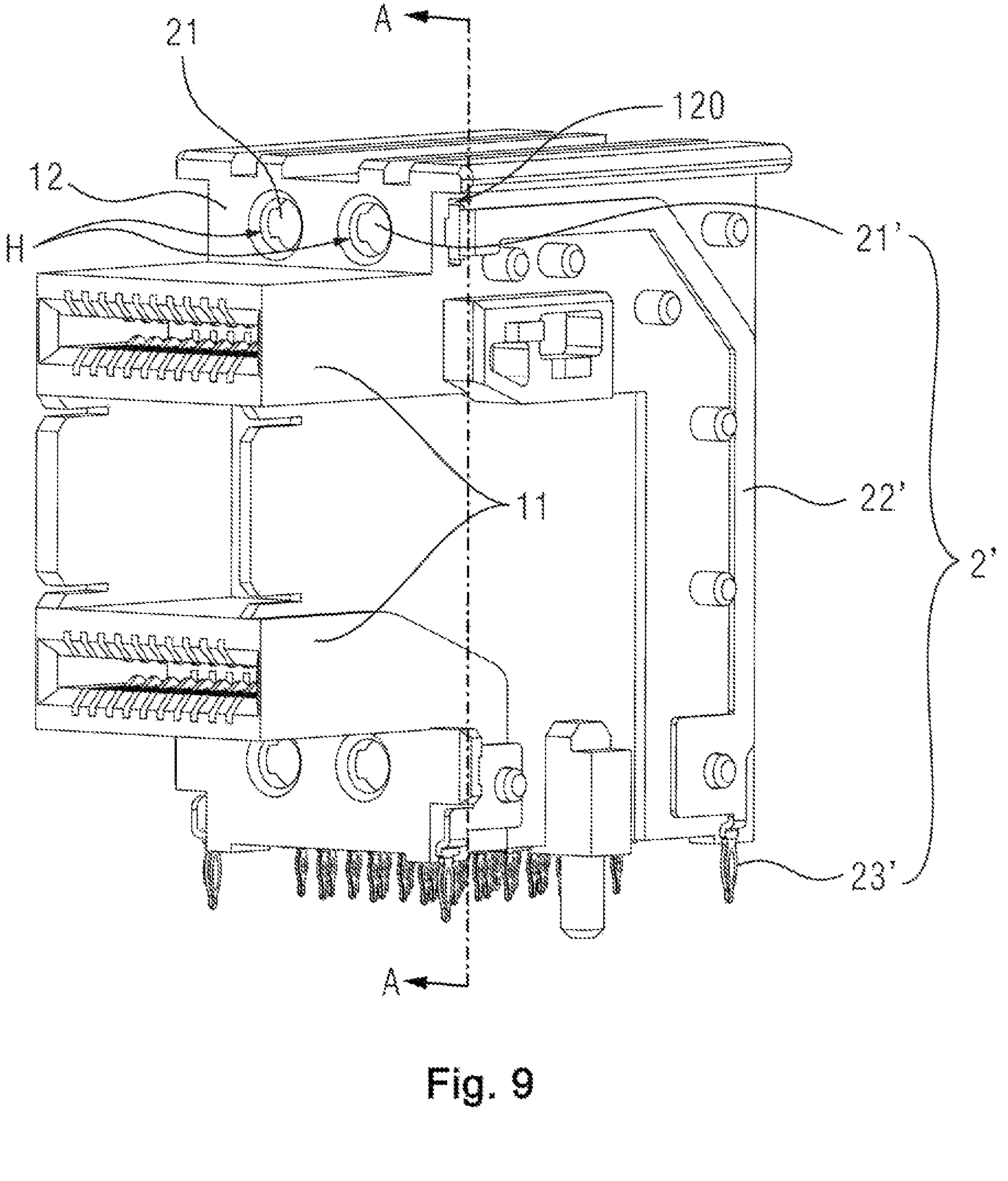
FIG. 9 is a perspective view showing a connector of another embodiment of the disclosure.
Figure 10:
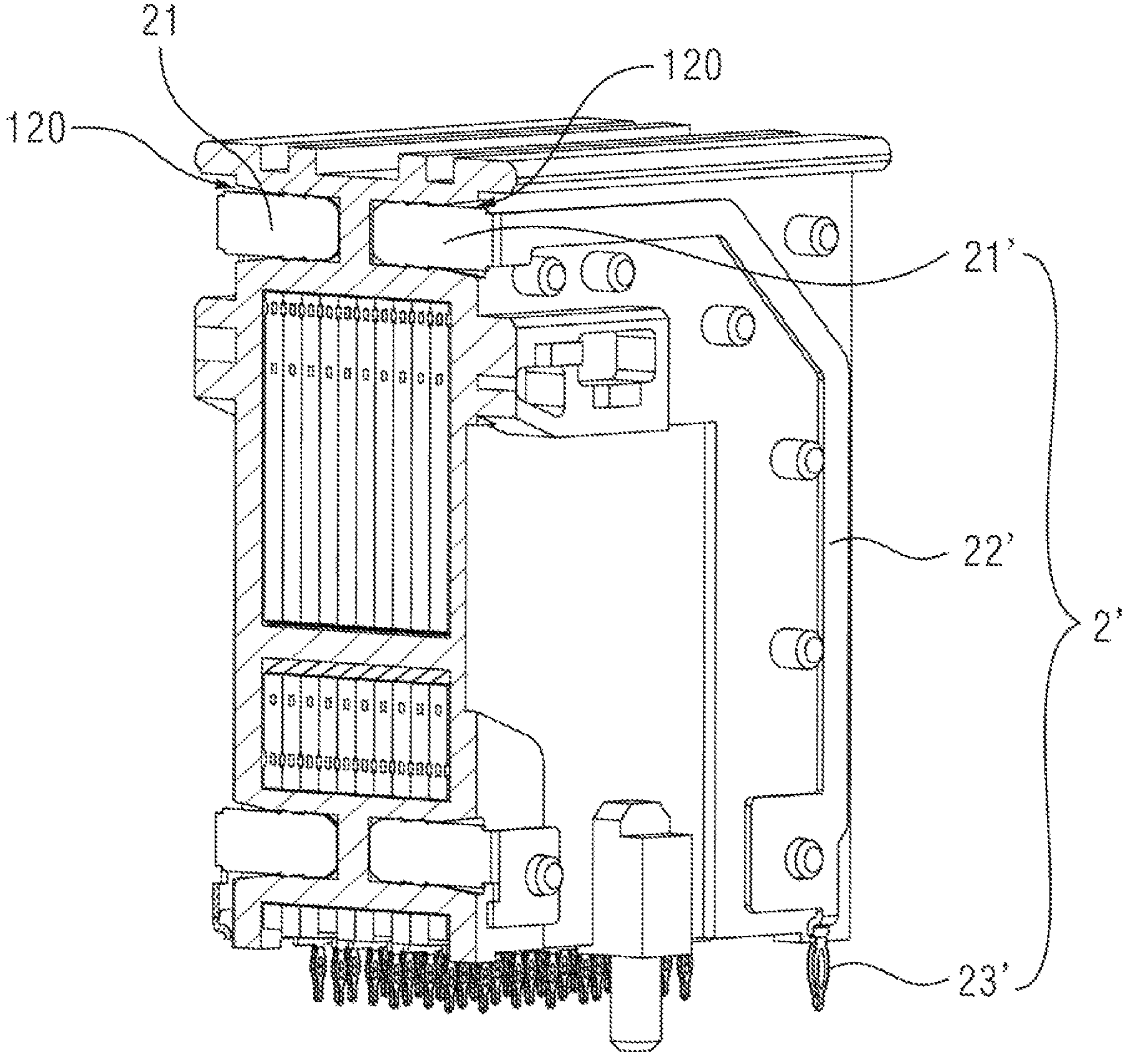
FIG. 10 is a section view taken along broken line A-A of the connector shown in FIG. 9.

As shown in FIG. 9 and FIG. 10 (FIG. 10 is a section view taken along the broken line A-A the connector shown in FIG. 9 toward a direction indicated by the arrow, the view is a direction seen from the front wall toward the back wall similar to FIG. 9, wherein the terminal head portions 21, 21' of two terminals 2, 2' located within the internal accommodation space 120 are specifically shown), in another possible embodiment, in the connector 100 in the form of a single-layer connector or a double-layer connector of the disclosure, the terminal head portion 21 of the terminal 2 may extend in a direction perpendicular to the side wall or in a direction parallel to the front wall so as to overlap with just one insertion hole H; and another terminal 2' having a similar configuration and arrangement to the terminal 2 is provided symmetrically on the side wall (opposite to the side wall where the terminal connecting portion of the terminal 2 is provided) shown in FIGS. 9-10, such that the terminal head portion 21' of the terminal 2' can be inserted from the side wall into the internal accommodation space 120 of the second receiving portion 12 so as to overlap with another insertion hole H, wherein the bending direction of the terminal head portion 21 of one terminal 2 with respect to the terminal connecting portion thereof are opposite to the bending direction of the terminal head portion 21' of another terminal 2' with respect to the terminal connecting portion thereof.

In another possible embodiment, in the connector 100 in the form of a double-layer connector of the disclosure, the connector 100 comprises two second receiving portions 12 and a plurality of terminals 2, 2'. When the terminal 2 and another terminal 2' are symmetrically arranged on two opposite side walls respectively such that the two terminal head portions 21, 21' are respectively arranged in the internal accommodation space 120 of the same one second receiving portion 12 and respectively overlap with the two insertion holes H, two other terminals 2, 2' are also symmetrically arranged on the two opposite side walls such that the two terminal head portions 21, 21' thereof are respectively arranged in the other second receiving portion 12; or one terminal 2 is provided on one of the two opposite side walls such that the terminal head portion 21 is provided in the internal accommodation space 120 of the other second receiving portion 12 so as to overlap with corresponding two insertion holes H. The arrangement positions, number, etc. of the terminals 2, 2' may be set as required, but the disclosure is not limited thereto.

Furthermore, in particular, depending on different applications, the terminal 2 can be an optical module terminal, a high-voltage electrical module terminal or a grounding module terminal. In the case that the terminal 2 is the high-voltage electrical module terminal, when the second receiving portions 12 of the connector 100 are electrically connected to and receive the additional module plugs 220 of the docking connector 200, the terminal 2 may provide high-voltage power through the additional module plugs 220 for use by the docking connector 200. In the connector 100 in the form of a single-layer connector or a double-layer connector of the disclosure, when the housing 1 comprises at least more than two terminals, the terminals may be different types of terminals or same type of terminals as required. For example, two terminals 2 and 2' provided in the same one second receiving portion 12 or two terminals respectively provided within two second receiving portions 12 may all be one of an optical module terminal, a high-voltage electrical module terminal and a grounding module terminal, or any two of the optical module terminal, the high-voltage electrical module terminal and the grounding module terminal. In addition, the module type of the terminals may also be correspondingly applied according to the application of the additional module plugs 220 of the docking connector 200.

Specifically, as shown in FIG. 3 or 9, the terminal head portion 21, 21' is located at a first end portion of the terminal 2, 2', and the terminal connecting portion can further comprise a terminal tail portion 23, 23' and a terminal middle portion 22, 22'. The terminal tail portion 23, 23' is located at a second end portion of the terminal 2, 2' opposite the first end portion, for insertion onto a PCB (not shown). The terminal middle portion 22, 22' is located between the terminal head portion 21, 21' and the terminal tail portion 23, 23'. The terminal 2, 2' can be made by stamping or cutting, and the terminal 2, 2' can also be a single piece or integrally formed.

Figure 6:
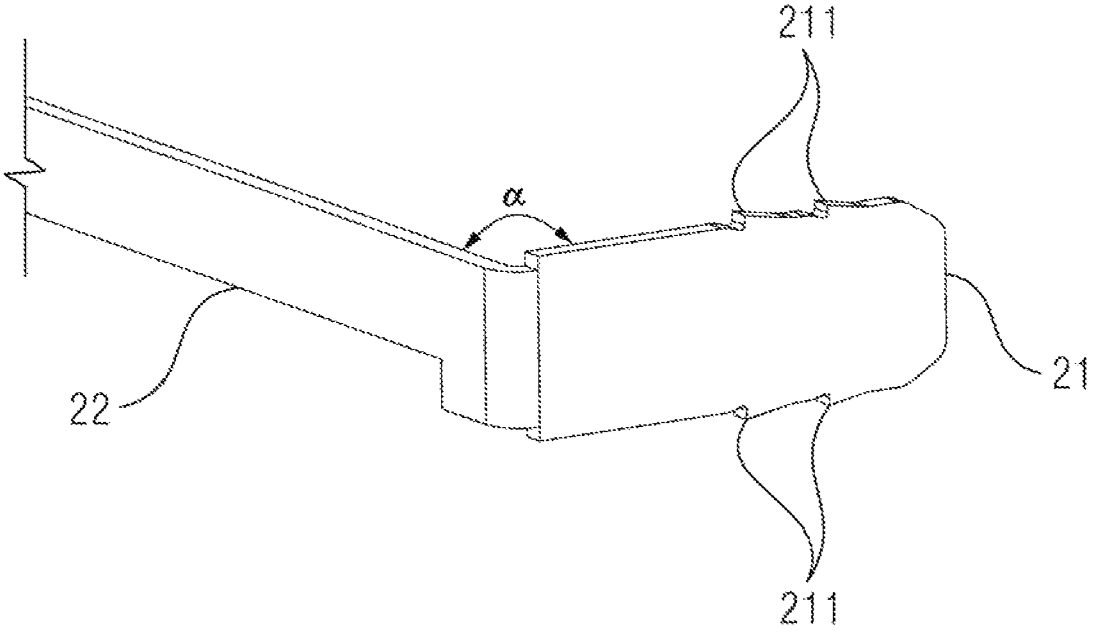
FIG. 6 is a partial perspective view showing the terminal of the connector of the disclosure.

As shown in FIG. 6, barbed protrusions 211 are respectively provided at an upper side and a lower side of the terminal head portion 21 which are parallel to the front wall and are opposite to each other. Further, the upper side and the lower side of the terminal head portion 21 respectively correspond to the top portion 123 and the bottom portion 124 of the second receiving portion 12, and the barbed protrusions 211 provided on the upper side and the lower side of the terminal head portion 21 extend toward the top portion 123 and the bottom portion 124 of the second receiving portion 12, respectively. When the terminal head portion 21 is inserted into the internal accommodation space 120 of the second receiving portion 12, the barbed protrusions 211 are in interference fit with the second receiving portion 12, in particular in interference fit with the top portion 123 and the bottom portion 124 of the second receiving portion 12, thereby ensuring a secure fixing of the terminal 2.

Figure 5:
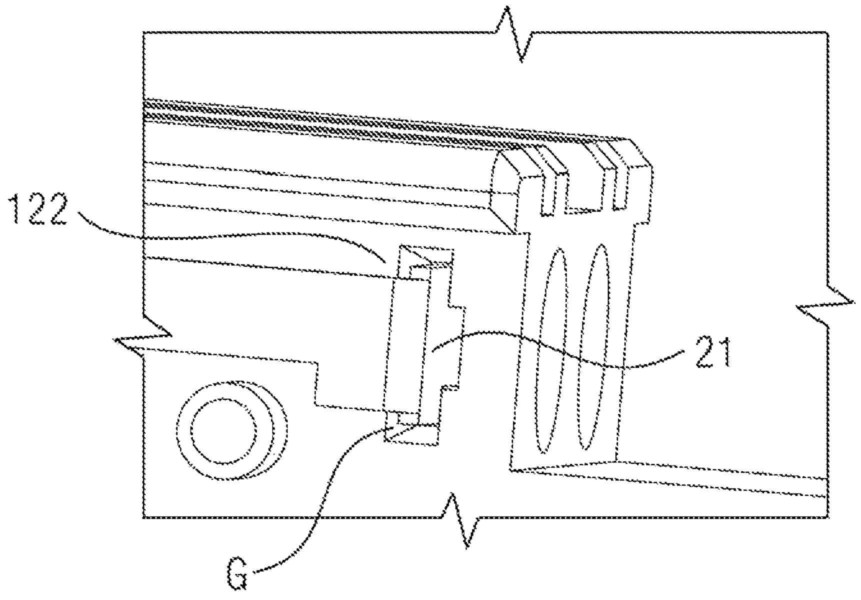
FIG. 5 is a perspective view showing a part of the housing of FIG. 4 to which a terminal is mounted.
Figure 7:
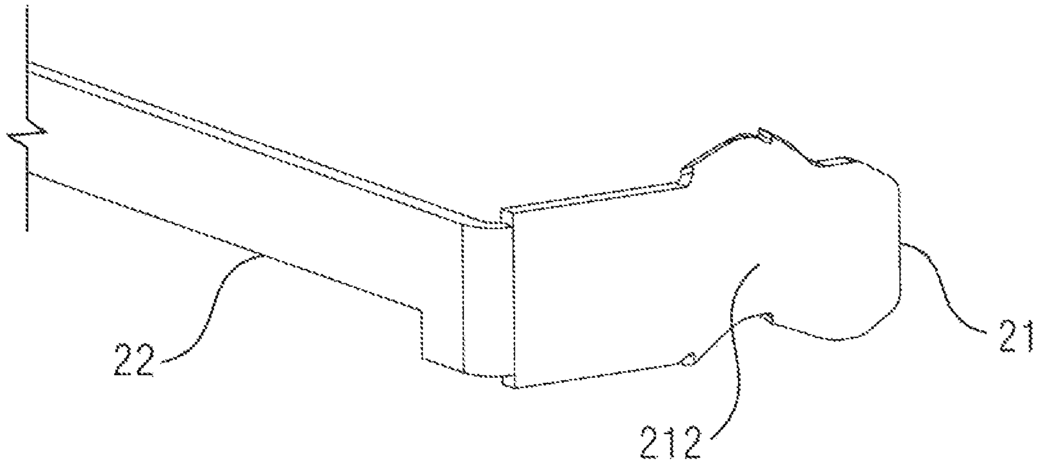
FIG. 7 is a schematic view showing an elastic portion of a terminal head portion of FIG. 6 after elastic deformation.

Referring to FIGS. 4-5, in the internal accommodation space 120 of the second receiving portion 12, a gap G may be left between the terminal head portion 21 and the front portion 121 or the rear portion 122 of the second receiving portion 12, and in addition, a gap may also be left between the terminal head portion 21 and the top portion 123 or the bottom portion 124 of the second receiving portion 12. Referring to FIGS. 6-7, the terminal head portion 21 may comprise an elastic portion 212, such that when the terminal head portion 21 is fitted with the additional module plugs 220, the elastic portion 212 can elastically deform within the gap G towards the front portion 121 or the rear portion 122 of the second receiving portion 12; and even as there is a gap between the terminal head portion 21 and the top portion 123 or bottom portion 124 of the second receiving portion 12, there is a larger space or gap for elastic deformation of the elastic portion 212 of the terminal head portion 21. In particular, the elastic portion 212 is located at positions of the terminal head portion 21 fitting with the additional module plugs 220 of the docking connector 200. Alternatively, in an embodiment not shown, when the terminal head portion 21 is fitted with the additional module plugs 220, the entire terminal head portion 21 may elastically swing within the gap G towards the front portion 121 or the rear portion 122 of the second receiving portion 12. Preferably, the distance between the front portion 121 and the rear portion 122 of the second receiving portion 12 is greater than 0.2 mm.

Figure 8:
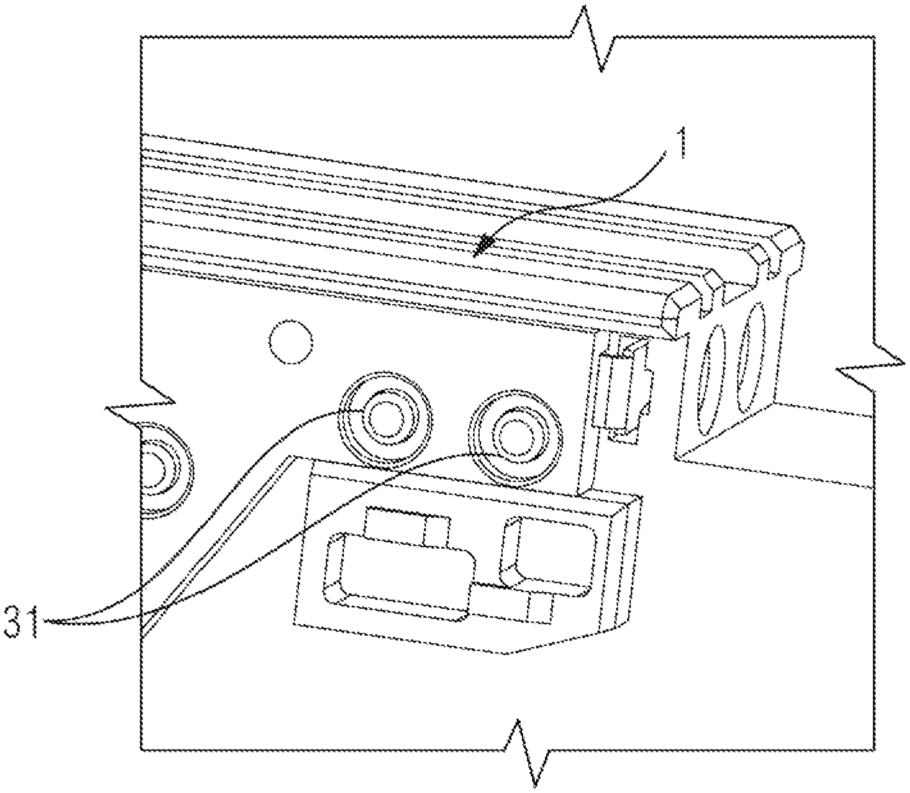
FIG. 8 is a perspective view showing a part of the connector of the disclosure.

As shown in FIG. 2, the connector 100 may further comprise at least one insulation member 3. The insulation member 3 can be made of insulation material or non-conductive material, such as plastic, but is not limited thereto. The at least one insulation member 3 is connected to an outer surface of a corresponding side wall of the housing 1. The terminal connecting portion of the terminal 2 is connected to the insulation member 3 and is provided between the insulation member 3 and the housing 1. The insulation member 3 may be molded together with the terminal 2 to form a wafer to mount on the side wall of the housing 1. Further, the insulation member 3 is molded together with a part of the terminal connecting portion of the terminal 2 or the terminal middle portion 22 of the terminal 2 to form a wafer, and the terminal head portion 21 of the terminal 2 is exposed outside the wafer. When the wafer is configured on an outer surface of the side wall of the housing 1, the terminal head portion 21 of the terminal 2 exposed outside the wafer is provided in the second receiving portion 12. The wafer can be made of insulation material or non-conductive material. By means of such arrangement, insulation and protection functions can be achieved. As shown in FIG. 2 and FIG. 8, the wafer may be connected to the side wall of the housing 1 by means of wafer connecting portions 31 in a manner such as hot riveting or snap fitting. In particular, the wafer connecting portions 31 may be riveting posts or clips, or the wafer connecting portions 31 may be recesses or holes for mounting on riveting posts or clips formed or provided on the outer surface of the side wall of the housing 1.

In conjunction with FIG. 3 and FIG. 6, the angle α where the terminal head portion 21 is bent relative to the terminal connecting portion may be 90 degrees or approximately close to the corresponding angle intersected by connection of the front wall and the side wall of the housing 1, such that the terminal connecting portion is attached on an outer surface of one side wall of the housing 1, and the terminal head portion 21 is inserted into the internal accommodation space 120 of the second receiving portion 12 in a direction perpendicular to one side wall or in a direction parallel to the front wall.

In general, a first embodiment of the disclosure provides a connector, that is, when the connector 100 of the disclosure is a single-layer connector, the connector 100 is used for fitting with the docking connector 200 comprising an electrical module plug 210 and additional module plugs 220, wherein the connector 100 comprises a housing 1 having a front wall, a rear wall and two opposite side walls connecting the front wall and the rear wall, wherein the housing 1 comprises a first receiving portion 11 concavely provided with a socket 111 from the front wall toward the rear wall of the housing 1 for receiving the electrical module plug 210 of the docking connector 200 and a second receiving portion 12 provided on the front wall for receiving the additional module plugs 220 of the docking connector 200, wherein the connector 100 further comprises a terminal 2 comprising a terminal head portion 21 and a terminal connecting portion which are connected to each other, the terminal head portion 21 being bent at an angle α with respect to the terminal connecting portion such that the terminal head portion 21 is provided in the second receiving portion 1 for connecting to the additional module plugs 220, and the terminal connecting portion being provided on an outer surface of one of the two side walls.

A second embodiment of the disclosure provides another connector, that is, when the connector 100 of the disclosure is a double-layer connector, the connector 100 is used for fitting with a docking connector 200 comprising an electrical module plug 210 and additional module plugs 220, wherein the connector 100 comprises a housing 1 having a front wall, a rear wall and two opposite side walls connecting the front wall and the rear wall, wherein the housing 1 comprises: two first receiving portions 11, each of which being concavely provided with a socket 111 from the front wall toward the rear wall of the housing 1, for receiving the electrical module plug 210 of the docking connector 200; and two second receiving portions 12 provided on the front wall, for receiving the additional module plugs 220 of the docking connector 200; wherein the connector 100 further comprises two terminals 2, each of which comprising a terminal head portion 21 and a terminal connecting portion which are connected to each other, the terminal head portion 21 being bent at an angle α with respect to the terminal connecting portion, such that the terminal head portion 21 is provided in the corresponding second receiving portion 12 for connecting to the additional module plugs 220; wherein the terminal connecting portions of the two terminals 2 are provided on an outer surface of same one of the two side walls, or the terminal connecting portion of one of the two terminals 2 is provided on an outer surface of one of the two side walls and the terminal connecting portion of the other of the two terminals 2 is provided on an outer surface of the other of the two side walls. The arrangement or configuration of the two first receiving portions 11 and the two second receiving portions 12 of the connector 100 may be substantially similar to the arrangement or configuration of the two first receiving portions 11 and the two second receiving portions 12 included in the described connector 100 in the form of a double-layer connector, but the disclosure is not limited thereto.

By means of the above arrangement, the connector 100 of the disclosure can be compatible with additional applications while being suitable for standard applications, especially applications in high voltage power supply with a voltage exceeding 5 V.

The foregoing content merely relates to preferable embodiments of the disclosure and is not intended to limit the disclosure. For a person skilled in the art, the disclosure may have various modifications and variations. Any modifications, equivalent replacements, improvements, etc. made within the spirit and principle of the disclosure shall belong to the scope of protection of the disclosure.

What claimed is:

1. A connector for fitting with a docking connector comprising an electrical module plug and additional module plugs, wherein the connector comprises a housing having a front wall, a rear wall and two opposite side walls connecting the front wall and the rear wall, wherein the housing comprises:

a first receiving portion concavely provided with a socket from the front wall toward the rear wall of the housing, for receiving the electrical module plug of the docking connector; and a second receiving portion provided on the front wall, for receiving the additional module plugs of the docking connector, wherein the connector further comprises a terminal comprising a terminal head portion and a terminal connecting portion which are connected to each other, the terminal head portion being bent at an angle with respect to the terminal connecting portion such that the terminal head portion is provided in the second receiving portion for connecting to the additional module plugs, and the terminal connecting portion being provided on an outer surface of one of the two side walls.

2. The connector according to claim 1, wherein the second receiving portion comprises a front portion and a rear portion opposite to each other and a top portion and a bottom portion opposite to each other and connecting the front portion and the rear portion, and the second receiving portion comprises two side portions opened by penetrating the two side walls of the housing;

wherein the second receiving portion further comprises an internal accommodation space defined by the front portion, the rear portion, the top portion, and the bottom portion, the terminal head portion being inserted into the internal accommodation space from one of the two side portions of the second receiving portion in a direction perpendicular to the one side wall or in a direction parallel to the front wall.

3. The connector according to claim 1, wherein the second receiving portion comprises an internal accommodation space and at least one insertion hole concavely provided from the front wall and in communication with the internal accommodation space, the terminal head portion being provided within the internal accommodation space, and at least a part of the terminal head portion being exposed from the at least one insertion hole for connecting to the additional module plugs when the at least one insertion hole receives the docking connector.

4. The connector according to claim 1, wherein the second receiving portion comprises an internal accommodation space, the terminal head portion being provided within the internal accommodation space, and barbed protrusions being respectively provided at an upper side and a lower side of the terminal head portion which are opposite to each other, and the barbed protrusions being in interference fit with the second receiving portion.

5. The connector according to claim 2, wherein in the internal accommodation space of the second receiving portion, a gap is left between the terminal head portion and the front portion or the rear portion of the second receiving portion, wherein the terminal head portion comprises an elastic portion, such that when the terminal head portion is fitted with the additional module plugs, the elastic portion can elastically deform within the gap towards the front portion or the rear portion of the second receiving portion.

6. The connector according to claim 2, wherein a distance between the front portion and the rear portion of the second receiving portion is greater than 0.2 mm.

7. The connector according to claim 1, wherein the connector further comprises at least one insulation member connected to an outer surface of the corresponding side wall of the housing, wherein the terminal connecting portion of the terminal is connected to the insulation member and provided between the insulation member and the housing.

8. The connector according to claim 7, wherein the insulation member is molded together with the terminal to form a wafer.

9. The connector according to claim 1, wherein the second receiving portion comprises an internal accommodation space concavely provided from the two side walls and in communication with each other, the angle where the terminal head portion is bent relative to the terminal connecting portion being 90 degrees or approximately close to the corresponding angle intersected by the front wall and the one side wall of the housing, such that the terminal connecting portion is attached on the outer surface of the one side wall of the housing, and the terminal head portion is inserted into the internal accommodation space of the second receiving portion in a direction perpendicular to the one side wall or in a direction parallel to the front wall.

10. The connector according to claim 1, wherein the terminal is an optical module terminal, a high-voltage electrical module terminal or a grounding module terminal.

11. The connector according to claim 1, wherein the connector comprises two terminals, the terminal connecting portions of which being respectively provided on the outer surfaces of the two opposite side walls, and the terminal head portions of the two terminals being symmetrically provided in the second receiving portion for connecting to the additional module plugs.

12. The connector according to claim 1, wherein the second receiving portion comprises an internal accommodation space and at least one insertion hole concavely provided from the front wall and in communication with the internal accommodation space, the terminal head portion being provided within the internal accommodation space and the terminal head portion extending in a direction perpendicular to the one side wall or in a direction parallel to the front wall to overlap with the at least one insertion hole for connecting to the additional module plugs when the at least one insertion hole receives the docking connector.

13. The connector according to claim 1, wherein the connector comprises at least one insulation member connected to an outer surface of the one side wall of the housing, the terminal connecting portion of the terminal comprising a terminal tail portion and a terminal middle portion located between the terminal head portion and the terminal tail portion, wherein the insulation member is molded together with the terminal middle portion of the terminal to form a wafer, and the terminal head portion of the terminal is exposed outside the wafer.

14. The connector according to claim 1, wherein the second receiving portion further comprises an internal accommodation space concavely provided from the two side walls and in communication with two side portions opened by penetrating the two side walls of the housing, the terminal head portion being inserted into the internal accommodation space of the second receiving portion in a direction perpendicular to the one side wall or in a direction parallel to the front wall, the internal accommodation space being separated from the socket of the first receiving portion by a distance or the internal accommodation space being separated from the socket of the first receiving portion by at least one wall, the internal accommodation space and the socket of the first receiving portion being two independent spaces.

15. The connector according to claim 1, wherein the connector comprises two second receiving portions and two terminals, wherein the terminal head portions of the two terminals are respectively provided in the two second receiving portions and the terminal connecting portions of the two terminals are provided on an outer surface of one of the two side walls, or the terminal connecting portion of one of the two terminals is provided on an outer surface of one of the two side walls and the terminal connecting portion of the other of the two terminals is provided on an outer surface of the other of the two side walls.

16. A connector for fitting with a docking connector comprising an electrical module plug and additional module plugs, wherein the connector comprises a housing having a front wall, a rear wall and two opposite side walls connecting the front wall and the rear wall, wherein the housing comprises:

two first receiving portions, each of which being concavely provided with a socket from the front wall toward the rear wall of the housing, for receiving the electrical module plug of the docking connector; and two second receiving portions provided on the front wall, for receiving the additional module plugs of the docking connector;

wherein the connector further comprises two terminals, each of which comprising a terminal head portion and a terminal connecting portion which are connected to each other, the terminal head portion being bent at an angle with respect to the terminal connecting portion such that the terminal head portion is provided in the corresponding second receiving portion for connecting to the additional module plugs, wherein the terminal connecting portions of the two terminals are provided on an outer surface of a same one of the two side walls, or the terminal connecting portion of one of the two terminals is provided on an outer surface of one of the two side walls and the terminal connecting portion of the other of the two terminals is provided on an outer surface of the other of the two side walls.

* * * * *